United States Patent
Blickwedel et al.

(10) Patent No.: US 6,923,879 B1
(45) Date of Patent: Aug. 2, 2005

(54) METHOD FOR PRODUCING A TIRE

(75) Inventors: Holger Blickwedel, Hannover (DE); Horst Sergel, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/958,306

(22) PCT Filed: Jul. 13, 1999

(86) PCT No.: PCT/EP99/04895

§ 371 (c)(1),
(2), (4) Date: Oct. 9, 2001

(87) PCT Pub. No.: WO00/03867

PCT Pub. Date: Jan. 27, 2000

(30) Foreign Application Priority Data

Jul. 15, 1998 (DE) .......................................... 198 31 747

(51) Int. Cl.[7] .......................... B29D 30/60; B29D 30/72
(52) U.S. Cl. ..................... 156/117; 156/130; 156/130.7
(58) Field of Search ........................... 156/117, 96, 123, 156/128.6, 129, 130, 130.3, 130.7, 397, 133

(56) References Cited

U.S. PATENT DOCUMENTS

| | | | |
|---|---|---|---|
| 1,335,879 A | * | 4/1920 | Darrow ...................... 156/130 |
| RE25,349 E | | 3/1963 | Hanson |
| 3,223,572 A | | 12/1965 | Holloway et al. |
| 3,264,241 A | | 8/1966 | Abrahams et al. |
| 4,006,766 A | | 2/1977 | Takayanagi et al. |
| 4,155,789 A | * | 5/1979 | Wireman et al. ........... 156/130 |
| 4,240,863 A | | 12/1980 | Vinton |
| 4,279,683 A | | 7/1981 | Landsness |
| 4,552,521 A | | 11/1985 | Linnstaedter |
| 4,963,207 A | * | 10/1990 | Laurent ....................... 156/117 |
| 5,248,357 A | * | 9/1993 | Miyanaga et al. .......... 156/133 |
| 2001/0035255 A1 | * | 11/2001 | Sergel et al. ............... 156/130 |

FOREIGN PATENT DOCUMENTS

| | | | |
|---|---|---|---|
| DE | 296 12 955 | | 10/1996 |
| DE | 19718699 C1 | * | 5/1998 |
| EP | 0 264 600 | | 12/1990 |
| EP | 0 666 165 | | 8/1995 |
| EP | 729825 A2 | * | 9/1996 |
| GB | 1 048 241 | | 11/1966 |
| JP | 02212134 A | * | 8/1990 |
| JP | 5116150 | | 5/1993 |
| JP | 07251466 A | * | 10/1995 |
| JP | 09 254274 | | 9/1997 |

* cited by examiner

Primary Examiner—Geoffrey L. Knable
(74) Attorney, Agent, or Firm—Walter Ottesen

(57) ABSTRACT

The invention relates to a method for producing a tire, especially a pneumatic tire for a motor vehicles. The method includes a stepwise build up of the tire with a layer which is as airtight as possible, at least one casing ply (3), horn profiles, bead cores, side walls as well as a belt assembly including a belt web, if required, a belt layer (13) in one or more parts and a tread (15). The rubber of the tire side walls is applied as an extruded rubber strip (8) in the form of a spiral with several adjacent or partially overlapping turns (28a) on the side walls of the carcass which is at least previously shaped and, if required, provided with at least parts of the belt assembly.

9 Claims, 6 Drawing Sheets

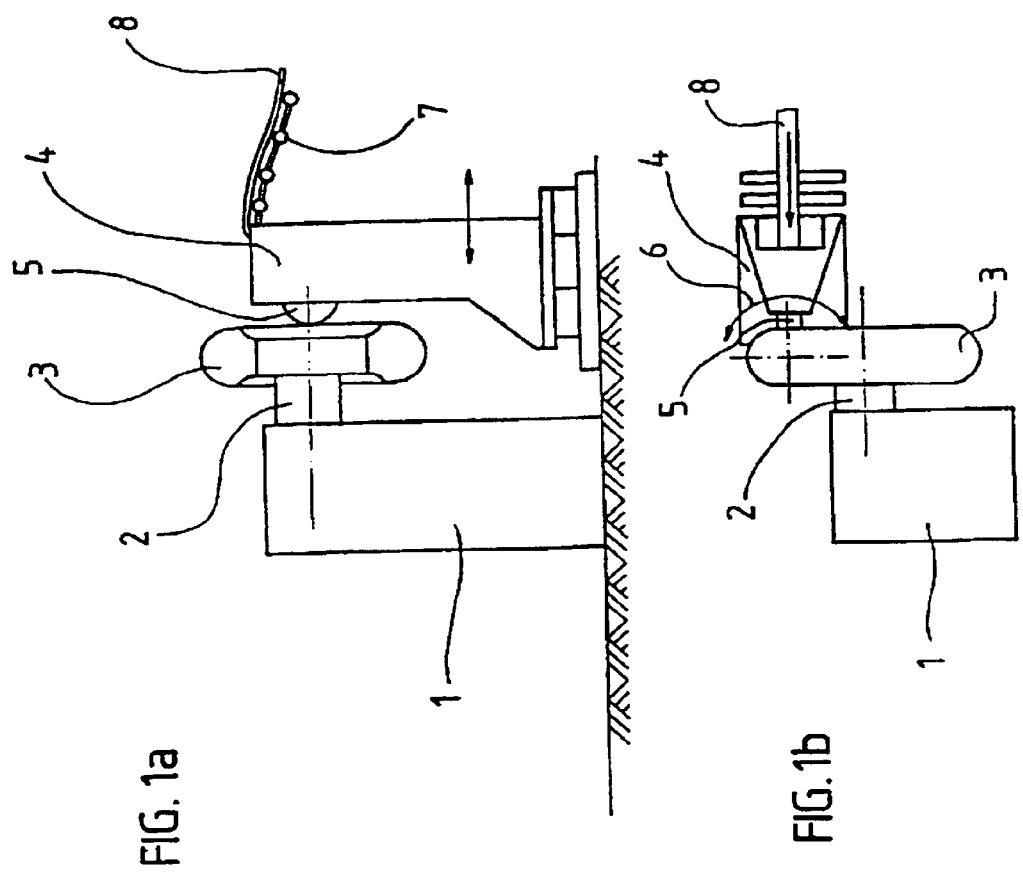

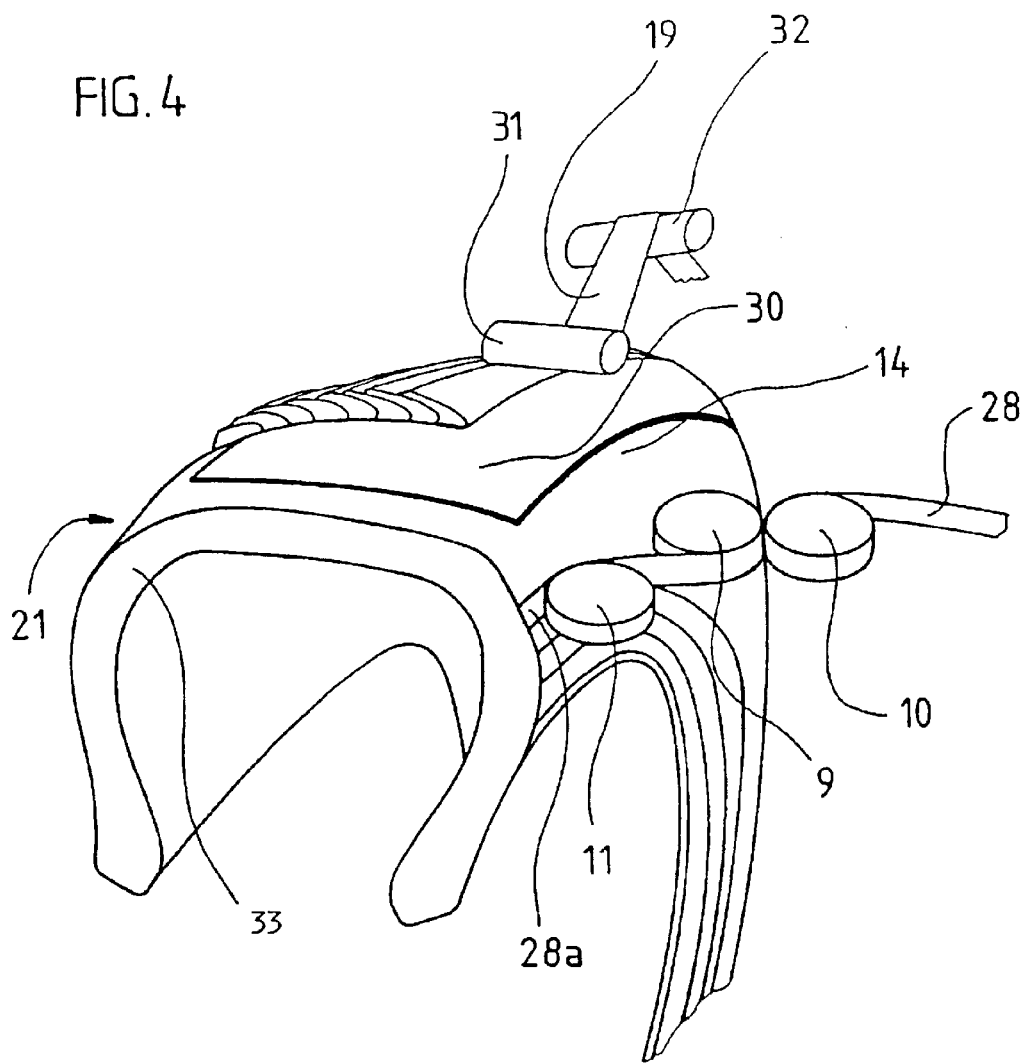

US 6,923,879 B1

METHOD FOR PRODUCING A TIRE

FIELD OF THE INVENTION

The invention relates to a method for producing a tire, especially of producing a pneumatic tire for motor vehicles. The method includes a stepwise assembly of the tire having a layer as air-tight as possible, at least a casing ply, horn profiles, bead cores, sides as well as a belt ply packet. The belt ply packet comprises a belt web and, where appropriate, a one-part belt layer or a multi-part belt layer and a tread strip substrate (base).

BACKGROUND OF THE INVENTION

In a classical method of manufacture of a tire, the side walls are formed already on the carcass building drum. Before or after placing the core and the core profiles, the laterally protruding rubber layers are bent back toward the center and then form the starter element of the first build-up stage. In this step, the side wall rubber is already applied or "built in".

With the subsequent shaping of the cylindrically-shaped starter element to a torus-shaped tire body, it must be considered that the geometry of the carcass can change because of expansion during shaping and also the volumes of the rubber layers, that is, therefore also those of the side wall rubber parts can shift so that already in advance an adjustment with respect thereto for compensation must be undertaken with the adjustment being determined empirically. After placing the belt ply packet, the vulcanization takes place during which a further displacement can be observed which likewise must be compensated by an advance adaptation of the entire manufacturing process. During the vulcanization, the completed starter element is subjected to an internal pressure via a bellows and is placed under increased temperature and then receives its so-called "residual rise", that is, an additional expansion to adapt to the vulcanization form. Such a compensation has associated with it the disadvantages that in those regions, which are subjected especially to the expansion, such as, for example, the sides, a precise metering of the rubber volume and an exact shaping are difficult.

The term "belt ply packet" is a conventional technical term in tire manufacture which does not only include the belt, that is, the belt layers per se, but also the additional components above the belt, which complete the tire starter element, namely, the tread and, if required, belt layers which may be present, inserts and tread strip substrate. This results from the manufacturing procedure, which is conventional in the classical two-step process, wherein these components are assembled to an annular-shaped packet on the belt build-up drum. The carcass starter element (the carcass packet), which is manufactured on a separate carcass build-up drum, is then pressed into the annular-shaped packet while expanding (shaping).

In retreading, methods are known wherein, after a corresponding preparation and brushing of the surfaces of the old tire (that is, the already contoured tire) via cold processing and heat processing, a new side wall rubber can also be applied. In contrast to the application of the tread (which can be placed on an approximately cylindrical surface), not only the disadvantage exists in the side walls placed in strip form, that a straight strip of side wall rubber has to be applied to an intensely convex side surface (arcuate outwardly) but the problem also exists that the side wall rubber strip is formed transversely to its longitudinal direction to a disc-shaped form which, in the strip material, causes intense deformations or expansions because of the different radii which then arise.

For this too, in the sense of an advance compensation, the side wall rubber strip has to be configured with a trapezoidally-shaped or triangular cross section so that, after the corresponding expansions, an almost equal strip thickness still remains on the side wall.

An additional problem is that the side wall strip, which is applied on a circular annular surface arched outwardly, must be cut to length after placement which leads to the situation that the radially outward regions, which are subjected to a significantly greater expansion than the radially inner regions, retract from the cut location whereby an approximately triangular or trapezoidal opening of the strip would result if the cut were not set correspondingly inclined or overlapping.

Each overlapping effects, however, an additional thickening of the side wall at only one location which is unwanted because of optical reasons but also because of the imbalance. As a rule, the excess must therefore be shaved which, in turn, disturbingly affects the production process, that is, the process of retreading.

A solution to this problem is disclosed in German utility model registration DE 296 12 955 U1 which discloses an arrangement with which the side walls can be injected, that is, extruded via extruder shoes which are especially formed and lie on the prepared surfaces. A solution of this kind ensures, inter alia, a uniform application of rubber via the special configuration and the pressing flat of the sides of the carcass but includes the disadvantage that, on the one hand, for each tire size, a special shoe must be provided and, on the other hand, a variable configuration of the thickness cannot be carried out only by influencing the extruder nozzle or the speed profile or even a change of the rubber mixture above the tire elevation. When retreading, pressing the sides flat has the additional disadvantage that, because of interruptions in stiffness in the sides already present in the tire (that is, such as by overlappings from the original manufacturing process), the applied layer thickness can be influenced.

U.S. Pat. No. 4,963,207 discloses a method for manufacturing new tires wherein all rubber parts of the tire are applied with the aid of one or several volumetric extruders movable in several axes. For this purpose, a tire build-up drum is used which is essentially already adapted to the later tire contour and is configured with a form of the side walls, treads, bead regions, et cetera, which substantially approaches a finished tire.

This rotating build-up drum is, as a rule, made of aluminum and all rubber parts, that is, treads, side walls, beads, et cetera, are sprayed thereon. Thereafter, the drum functions as a holding element to stabilize the form of the tire, which has not yet vulcanized, during the transfer to and in the vulcanization press. This has the consequence that the aluminum drum with the rubber is taken out of the wrapping position and is placed in an especially adapted vulcanization press in which a further outer form encloses the build-up drum and the tire and completely vulcanizes the tire.

With this method, the disadvantage is present that, for each vulcanization operation, the tire build-up drum must be transported and a precise and adjustable additional outer form (adapted to the production process) must be produced and the aluminum core, that is, the build-up drum, must be so configured that it can again be removed from the tire after the vulcanization and can again be built up within the wrapper station so that the advantage of the very variable and precise application of the rubber to all tire regions must be accepted with serious changes with respect to the classical manufacturing and vulcanization process.

SUMMARY OF THE INVENTION

For the invention, the task therefore was to provide a method for manufacturing tires wherein especially the side wall rubber parts can be applied without greater expansions on the outer radius and wherein a cutting of the side wall rubber parts in the mentioned type and also a thickening because of overlapping does not occur. In the method, the conventional manufacturing process can be retained at least with respect to vulcanization methods and vulcanization apparatus. In the method, a type of production is made the basis which can be carried out for all dimensions without large supplies of special tools and the method is cost-effective and saves material for all dimensioning regions and tire types.

The side wall rubber of the tire is applied as an extruded rubber strip in the form of a spiral having several mutually adjacent or at least partially overlapping windings on the sides of a carcass which at least has already been shaped and, if needed, provided with at least parts of the belt ply packet.

With the application onto an already shaped carcass, one prevents the introduction of larger deformations in the additional rubber materials, which are still to be placed and are still soft or "green" so that the side wall, that is, the side wall rubber can be applied in desired layer thicknesses without any pretensions and without non-uniformities in the contour. In addition, the necessity of support or form bodies becomes superfluous which can be manipulated during the remaining processing method only with difficulty.

A material thickening is achieved with the application in the form of a spiral in addition to a simple control of the feed in specific radial regions, for example, in the region of the apex or "filler". This makes the placement of additional strips unnecessary. The spirals have several mutually adjacent or partially overlapping turns. Since the carcass contour is already shaped, targeted thickenings can be applied with this measure in the flank regions of the tire without considering compensation volumes. The thicknenings are provided, for example, as edge protection or for stabilization with respect to natural resonances of the tire.

The side wall rubber, which is applied as an extruder rubber strip, can be so applied for a carcass, which is already provided with at least parts of the belt ply packet, that the shoulder regions of the belt ply packet are also overlapped or covered in the simplest manner.

Such a covering or overlapping and the especially reliable connection of the highly-loaded edge regions or shoulder regions of the belt ply packet with the side wall rubber, which is possible thereby, results in an advantageous manner especially when the carcass is provided with a belt ply packet and the tread is applied to the belt ply packet in advance of or during the application of the side walls. The belt ply packet comprises belt layers and a tread strip substrate.

In this way, a layered interlaced overlapping can be generated in the above-mentioned loaded regions in the simplest manner. This overlapping makes available a proper clamping between side walls and belt ply packet, that is, the tread, after the vulcanization. With an appropriate guidance of the applied extruded side wall rubber strip, the tread strip substrate can first be overlapped in the shoulder regions whereupon the tread is applied thereon which is then covered once again in its shoulder regions by the side wall rubber strip.

A further advantageous embodiment of the method comprises that the tread is applied as an extruded rubber strip either as an individual strip, which corresponds essentially to the tread width, or screw shaped with mutually adjacent windings or partially self-overlapping turns on the peripheral surface of the belt assembly. Here too, an interlacing or overlapping in the shoulder region can be easily carried out.

While the rubber strip for the side wall rubber is applied essentially spirally shaped, there results an application approximately in the form of a screw line during application of the tread because of the almost equal radii in or on the belt assembly. In addition to the advantages of the variation of the layer thickness only by volumetric control and change of the feed of an extruder, one achieves, with such a process, a uniform manufacturing method for side strips and tread and substantially approaches automatization without intermediate manual steps.

Advantageously, the tread is applied at the same time with the application of the side wall rubber and the extrusion speed, feed and the extrusion volume of the rubber strips for the side walls are so controlled during application that the clock time for the application of the side walls and of the tread strip is almost the same. In the classical method, the tread is laid down as one piece as a strip corresponding approximately to the tire width.

In this way, an advantageous inclusion of the application of the rubber strip results for the side walls in the total production process. With the synchronous application, the usually sequentially following work steps are combined in time and the clock time for the manufacture of the tire is shortened.

A further advantageous configuration of the method comprises that the side wall strip and the tread can be applied with a single extruding device. The complexity for an extruder suitable for this purpose and for the control is greater than for a standard extruder, but only one extruder device is required so that a simplification with respect to machinery results with a view to the total system and the number of the necessary conventional application stations.

In a further advantageous embodiment, the side wall rubber of the tire is applied as an extruded rubber strip in the form of a spiral onto the sides of a carcass which is already produced in its final contour and is at least partially vulcanized. The spiral has several mutually adjacent or at least partially overlapping turns. After applying the tread, the tire is fully cured.

Because of the application to a carcass which is already, as a rule, completely vulcanized, the necessity of support bodies or form bodies during the further processing method is unnecessary because the rubber matrix is already cured and the reinforcement elements are tightly bonded within this rubber matrix. With a complete prevulcanization, one can essentially omit the residual rise so that the side wall or the side wall rubber can be applied in any desired layer thickness without any pretensions and without any non-uniformity in the contour.

To simplify and standardize the extruder used and especially the extruder nozzles, the method is advantageously so configured that the outlet cross section of the rubber strip is formed by one or several sets of profile rollers having a cross section different from the outlet cross section and is applied by a rolling application wheel onto the sides and/or onto the tread strip substrate of the carcass. The exit cross section of the rubber strip is predetermined by the extruder nozzle. The profile roller sets are easily exchanged (at least in comparison to an extruder nozzle) and can be adapted to the particular dimensions and mixtures of the rubber strips.

A further advantage especially with respect to the adaptation of the characteristics of individual regions of the tire results in that the tread and/or the side strip are applied successively or are applied by coextrusion with two or several extruded rubber strips of different mixture. The adaptation of the characteristics of the individual regions of the tire is made possible by special rubber mixtures.

In this way, the conductivity or the later wear performance can be influenced in the region of the tread; whereas, for the side strips, individual material hardnesses can be adjusted which can be arranged for reinforcement or in the form of an edge protection at desired locations. When utilizing extruder nozzles, which generate a somewhat wider rubber strip, advantages result when the arcuate contour of the side walls of the carcass is essentially pressed flat, during application of the rubber strip, at least partially to a form corresponding to an essentially planar disc. In this way, the control for the extruder, which applies the side wall rubber parts, can be simplified in that at least one additional axis guide becomes unnecessary.

In a further embodiment of the method, the tread is applied by applying two rubber strips with different extruders. A first extruder begins the application operation in a shoulder region with the base mixture and a second extruder follows with the cap mixture, if required, with a starting application point offset to the center of the tire. Such a method avoids back and forth travel of an extruder and simplifies the extruder configuration because the particular extruder nozzles must be designed only for one mixture and not for coextrusion and switchover from cap mixture to base mixture.

In an advantageous further embodiment, the cap mixture for the tread has another conductivity for the electrostatic charge than the base mixture. After applying the cap mixture, a further thin layer of the base mixture is applied in the regions which contain the peripheral grooves introduced during the subsequent vulcanization. In this way, the advantage is afforded that, for the subsequent profile formation, the peripheral grooves with the base mixture, which is applied once again at these locations, form a bridge to the conductive base mixture of the tread foundation so that electrostatic conductivity always remains ensured. The peripheral grooves are manufactured by a complimentary profile in the vulcanization form.

A further advantageous configuration for making available a continuous conductivity for electrostatic charges comprises that the cap mixture has a conductivity for the electrostatic charges different than that of the base mixture and that supply and overlapping of the first-applied base mixture in the regions, into which the peripheral grooves are pressed during the next vulcanization, is so adjusted that a thickening of the base mixture is achieved essentially up to the total layer thickness; whereas, in the next application of the cap mixture, feed and overlapping in the regions are so adjusted that a thinning or interruption of the cover layer occurs. These regions contain the peripheral grooves introduced during the next vulcanization. In this way, one generates a base layer in the region of the later peripheral grooves with the base layer being virtually continuous in the radial direction; whereas, in the neighboring regions, essentially the cap layer is applied in a corresponding thickness over the base layer. The cap layer is intended to satisfy the special requirements with respect to wear and wet-grip performance.

An energy savings in the manufacturing process results when, after application of the side strips and/or tread, the blank or starter element, which is still warm from manufacture in this region, is vulcanized in a form. In this way, the otherwise necessary heating or warm-up is made unnecessary.

A variation of the layer thickness for the side walls and the tread is possible anytime by changing the slope, the overlapping or the feed of the applied rubber strips so that here an adaptation can easily take place.

The described method can be especially applied to the manufacture of new tires, which are produced in two method parts A and B separate from each other. In method part A, a part tire is built up and subsequently cured out in a vulcanization form. The part tire contains essentially the carcass body and, if required, parts of the belt ply packet. The vulcanization form imparts a predetermined cross-sectional contour to the surface as well as to the reinforcement layer(s). In method part B, the part tire is built up to a complete tire with the addition of the still-missing parts of the belt ply packet and by adding the tread and by adding the side wall rubber parts which are still missing. The complete tire is then likewise subjected to a vulcanization process. Depending upon the manufacture and type of part tire, which is produced in method part A, the carcass body can already contain several side wall rubber parts, which are then completely built up in method part B.

Within such a manufacturing method having a completely vulcanized part tire, the application of extruded rubber strips for the side walls and tread can be especially well utilized and realized because a pregiven contour is already present and no complex measures are necessary to stabilize the carcass for manufacture. Likewise, the already existing part tire is in the position to serve as a carrier element for the subsequent complete vulcanization which significantly simplifies the transport and the method sequences overall. In addition, a carcass body, which is always premanufactured in the same form, can be used for the manufacture of an entire manufacturing series of different finished tires. The carcass body can then be differently prepared in method part B depending upon the desired embodiment of the finished tire.

BRIEF DESCRIPTION OF THE DRAWINGS

The invention will now be described with reference to the drawings wherein:

Shown are:

FIG. 1a shows a principle sketch in side elevation view of an arrangement which is suitable for applying the side wall rubber onto a carcass produced already in its final contour and at least partially vulcanized;

FIG. 1b is a plan view of the arrangement shown in FIG. 1a;

FIG. 3b is a plan view of the arrangement shown in FIG. 3a; and,

FIG. 4 is a schematic for the method shown in FIGS. 3a and 3b.

Figure 2A:
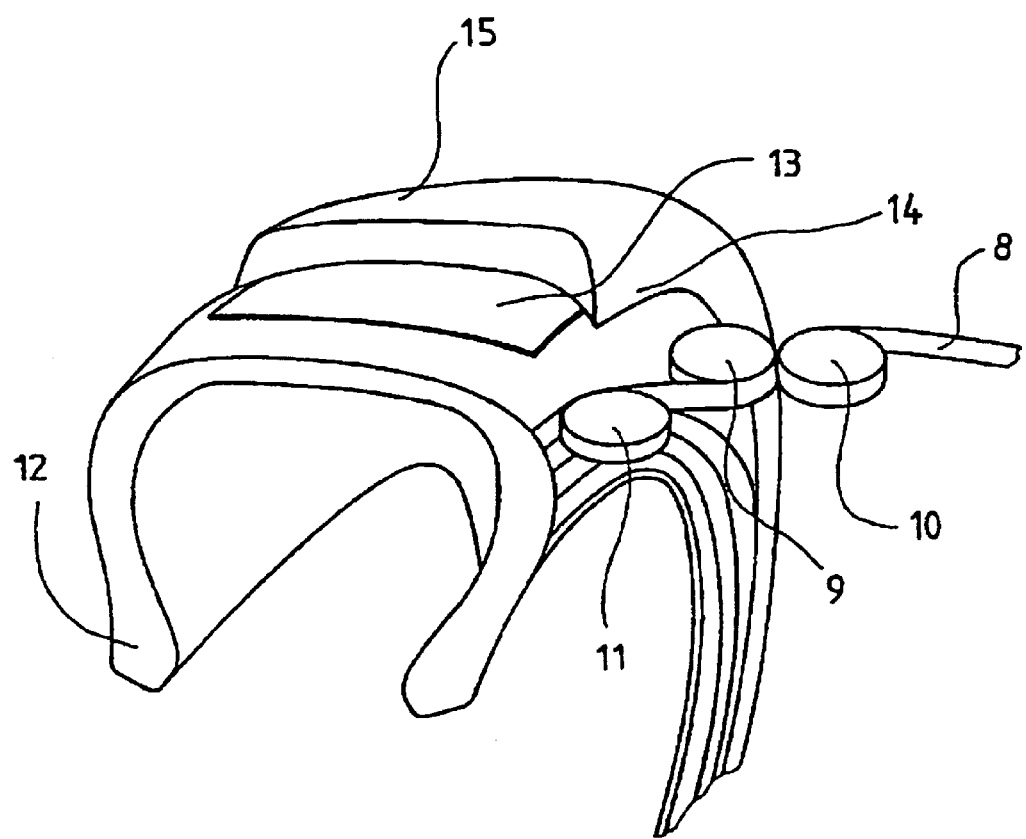
FIGS. 2a and 2b show the principle of the process shown in FIGS. 1a and 1b in two views.

DESCRIPTION OF THE PREFERRED
EMBODIMENTS OF THE INVENTION

FIG. 1a shows a rotating arrangement 1 having a holder 2 on which a carcass 3 is rotatably clamped with a spreader (not shown). The carcass 3 is at least partially vulcanized.

A small calender 4 on a mount can be moved in translation to the holder in at least two axes. The small calender 4 is in an application position with its roller head or roller system 5 for the application of a side strip. The roller head or roller system 5 is configured for applying the side strip. The roller head 5 is mounted to be pivotable over an arcuate segment 6 in order to be able to follow the arcuate outer contour of the sides of the carcass.

A feed roll path 7 is mounted at the rearward end of the small calender 4. The feed of the rubber in the form of, for example, a round rubber cord 8 takes place on the feed roll path 7. The round rubber cord 8 is supplied from an extruder (not shown). The formation of the round rubber cord to the desired shape of the rubber strip 8a for the side wall rubber takes place in the roller head 5.

Figure 2B:
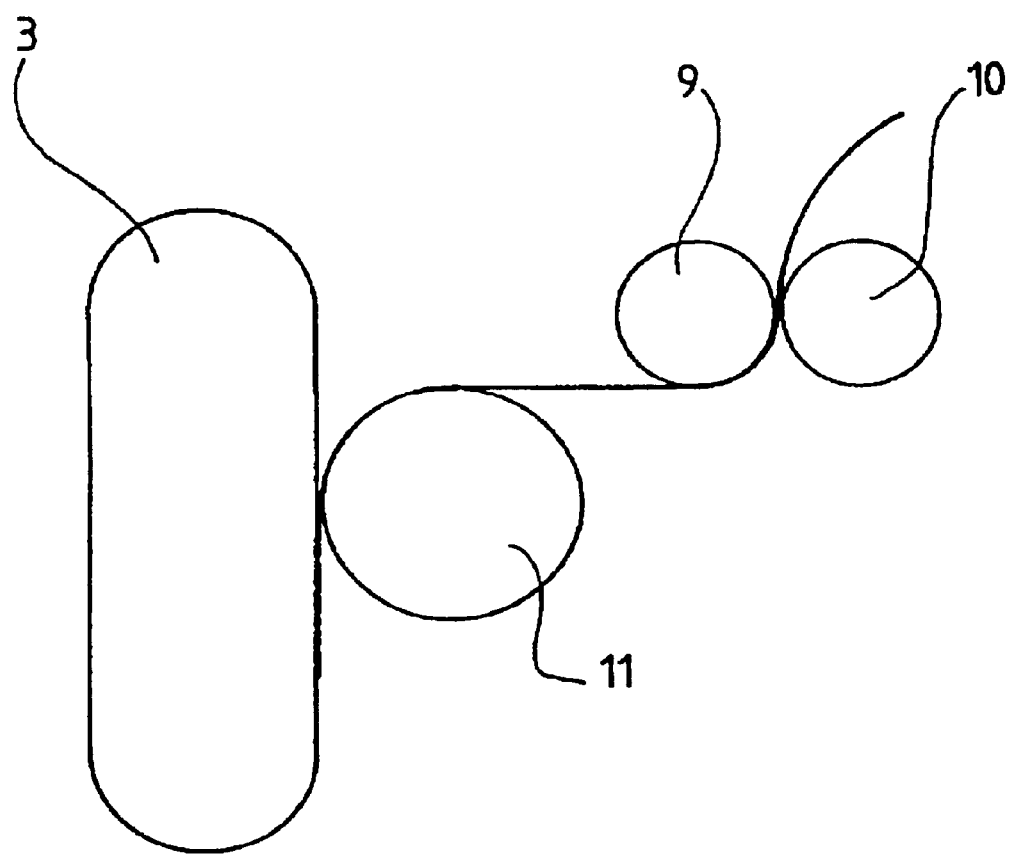

As shown in FIGS. 2a and 2b, the roller head 5 comprises essentially the profile rollers 9 and 10 which form a profile from the round rubber cord which is suitable for the spirally-shaped application of the rubber strip. The roller head 5 further comprises the pressure roller 11 which is positioned at the rotating carcass 3 to apply the necessary pressure for the application of the formed rubber strip.

The application operation starts usually in the bead region 12. As the application operation advances in the direction toward the belt plies 13 of the carcass, the pivoting of the roller head along the arcuate segment 6 takes place in addition to an adjustment of the elevation thereof, so that a uniform application of the extruded and formed rubber strip can take place either one next to the other or overlapping up into the shoulder region 14 of the tire carcass. Depending upon the method, the shoulder regions of an already applied tread 15 can be rolled on overlappingly so that, directly after the application of the rubber strips for the sides, the now completely assembled carcass body can be moved to the further vulcanization.

Figure 3A:
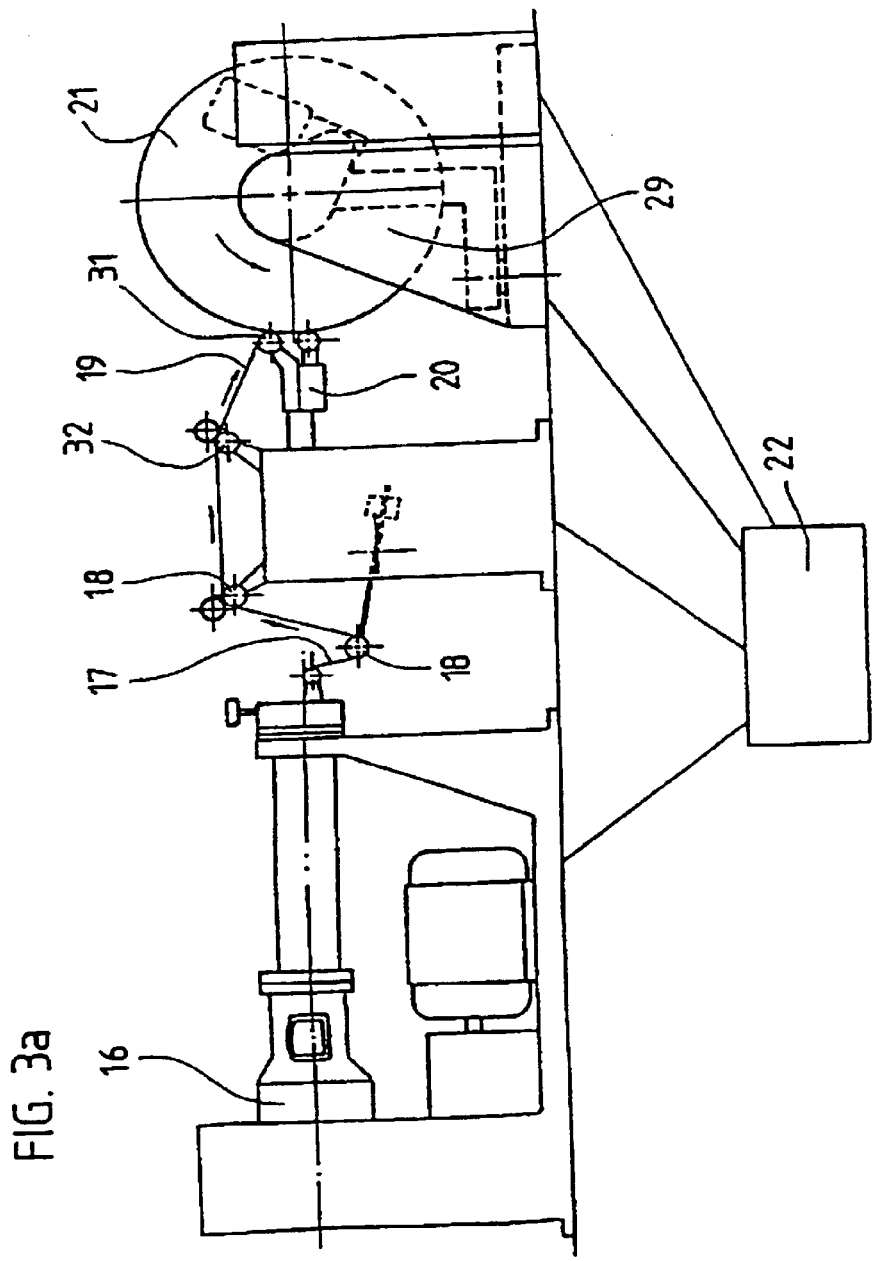
FIG. 3a shows a device suitable for applying the side wall rubber and the rubber strip for the tread onto a carcass which is already shaped and provided with belt plies.

FIG. 3a shows an arrangement with which the side wall rubber of the tire is applied to the side walls of a carcass as an extruded rubber strip in the form of a spiral having several mutually adjacent or at least partially overlapping windings with the carcass being provided with the belt plies and being already shaped. At the same time, the tread is wound on as extruded strips screw-shaped with overlapping windings onto the peripheral surface of the belt ply packet.

FIG. 3a shows an extruder 16 for this purpose from which a material strip 17 is extruded. The material strip 17 has a round cross section because of the nozzle of the extruder. This round cord material strip 17 comprises a rubber mixture adapted for the tread. The extruded round core material strip is reconfigured into a flat form having a rectangular cross section by the direction-changing rollers 18 and by rollers (not shown) and is applied via an applicator head 20 to the tire starter element 21 to overlap. The starter element 21 comprises a carcass provided with the belt plies and is already shaped.

Figure 3B:
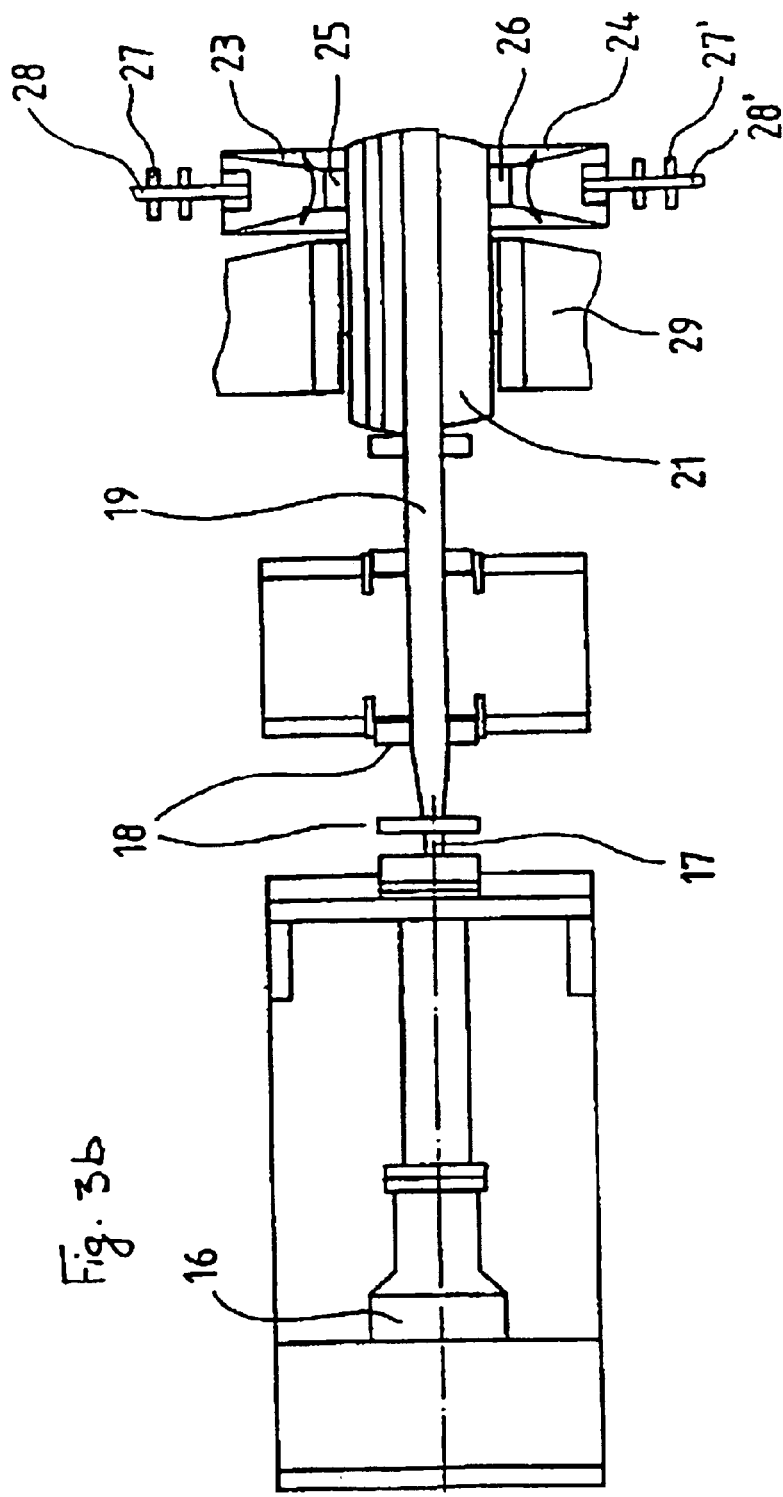

Viewed together with FIG. 3b in which the arrangement shown in FIG. 3a is shown in plan, one recognizes two small calenders 23 and 24 having roller heads 25 and 26 corresponding thereto with which (as also shown in FIGS. 2a and 2b) the sides of the tire starter element 21 are provided with a rubber strip for the side wall rubber. Here too, the roller heads are pivotally mounted in order to be able to follow the outer contour of the sides of the carcass. The rubber feed takes place via feed roller paths 27 and 27' in the form of a round rubber cord 28 and 28' supplied from an extruder (not shown).

The tire starter element is shaped on a build-up unit 29 via an inner bellows which can be subjected to pressurized air and tensioned. The build-up unit 29 is provided with a rotatable building drum.

The computer-supported control unit 22 connects and controls all equipment for the application of the strips of material in dependence upon the extruder 16 or in dependence upon the extruders making available the round rubber cord 28 (28').

FIG. 4 shows the process presented in FIGS. 3a and 3b once again as a principle sketch.

One recognizes here the tire starter element 21 which was shaped via an inflatable bellows (not shown) and comprises the shaped carcass body 33 and the belt ply packet 30 already applied.

The formed rubber strip 28a for the side wall rubber is applied by the profile and pressure rollers 9, 10 and 11 present in the roller heads 25 and 26. At essentially the same time as the application of formed rubber strip 28a, the application of the tread takes place in the form of an extruded and formed rubber strip 19. The rubber strip 19 is applied spirally with partially overlapping turns and is applied to the peripheral surface of the belt ply packet 30 via the application and direction changing rollers 31 and 32 mounted in the application head 20 for the rubber strip of the tread.

The application of rubber strips for the tread and side wall on an already shaped carcass prevents the introduction of greater deformations into the rubber materials to be applied so that the side wall rubber and the tread rubber can be applied in desired layer thickness without any prestresses and without discontinuities in the contour.

LIST OF REFERENCE NUMERALS

1 Rotating arrangement
2 Holder
3 Carcass
4 Small calender
5 Roller head
6 Arcuate segment
7 Feed roll path
8 Round rubber cord
8a Rubber strip for the side wall rubber
9, 10 Profile roller
11 Pressure roller
12 Bead region
13 Belt ply
14 Shoulder region
15 Tread Strip
16 Extruder
17 Strip of material for the tread
18 Direction-changing roller
19 Rectangular material strip
20 Applicator head
21 Tire starter element
22 Control unit
23, 24 Small calender
25, 26 Roller head
27, 27' Feed roller path
28, 28' Round rubber cord
28a Rubber strip for the side wall rubber
29 Build-up unit
30 Belt ply packet
31, 32 Applicator roller/Direction-changing roller
33 Shaped carcass body

What is claimed is:

1. A method of producing a pneumatic tire for a motor vehicle, the method comprising the steps of:

providing a partial tire in the form of a carcass which has been constructed to include a layer, which is as air-impermeable as possible, at least one carcass ply, horn profiles, bead cores, and a belt ply packet, the belt ply packet including a tread strip substrate and, said carcass including sides and said carcass being already shaped;

applying an extruded rubber strip in the form of a spiral having several windings to said sides of said already shaped carcass to form the side wall rubber of said tire with said windings being applied so as to partially overlap or lie one next to the other whereby the application of said extruded rubber strip to said already shaped carcass permits the side wall rubber to be applied in desired layer thicknesses without pretension and without non-uniformities in contour; and, pressing the arcuate contour of the sides of the carcass at least partially flat into a form corresponding essentially to a planar disc for and during winding of the rubber strip whereby a guidance of a nozzle for said extruded rubber strip along an additional axis is avoided.

2. The method of claim 1, wherein the method further comprises the step of applying a tread strip to said belt ply packet prior to or during the application of said side wall rubber.

3. The method of claim 2, further comprising applying said tread strip as an extruded rubber strip to the peripheral surface of the belt ply packet either as an individual strip or as spirally-shaped windings, the individual strip corresponding essentially to the tread width and the windings being at least partially overlapping or lying one next to the other.

4. The method of claim 3, wherein, at the same time with the application of the side wall rubber, the method further comprising applying said tread strip and so controlling the extrusion speed, the feed and the extrusion volume of the rubber strips for the side walls during application that the clock times for the application of the rubber strips for the side walls and for the application of said tread strip are approximately the same.

5. The method of claim 2, wherein said belt ply packet includes belt layers and a tread substrate.

6. The method of claim 1, wherein a new tire is produced in two method parts A and B separate from each other; in method part A, a part tire, which contains essentially the carcass body, is built up and, thereafter, is completely vulcanized in a vulcanization form which imparts a predetermined cross-sectional contour to the surface as well as to the reinforcement; and, in method part B, the part tire is built up by adding the parts of the belt ply packet which may still be missing and by adding the tread strip and by adding the respective side wall rubber parts to a complete tire which is likewise subjected to a vulcanization operation.

7. The method of claim 1, wherein said belt ply packet further includes a one-part or multi-part belt layer and a tread strip.

8. The method of claim 1, wherein said shaped carcass is subjected to pressurized air to support said carcass in shaped form while said extruded rubber strip is applied thereto.

9. A method of producing a pneumatic tire for a motor vehicle, the method comprising the steps of:

providing a partial tire in the form of a carcass which has been constructed to include a layer, which is as air-impermeable as possible, at least one carcass ply, horn profiles, bead cores, and a belt ply packet, the belt ply packet including a tread strip substrate and, said carcass including sides and said carcass being already shaped;

applying an extruded rubber strip in the form of a spiral having several windings to said sides of said already shaped carcass to form the side wall rubber of said tire with said windings being applied so as to partially overlap or lie one next to the other whereby the application of said extruded rubber strip to said already shaped carcass permits the side wall rubber to be applied in desired layer thicknesses without pretension and without non-uniformities in contour;

said step of applying the side wall rubber of the tire as extruded rubber strips in the form of a spiral with several windings on the side walls of said carcass, the windings lying one next to the other or are at least partially overlapping, is performed on said carcass with said carcass being first partially vulcanized and produced already in its final contour;

applying said side wall strips successively as extruded rubber strips of different mixture;

pressing the arcuate contour of the sides of the carcass at least partially flat into a form corresponding essentially to a planar disc for and during winding of the rubber strip whereby a guidance of a nozzle for said extruded rubber strip along an additional axis is avoided;

then, after applying the tread strip, fully vulcanizing the tire; and, wherein said extruded rubber strip is formed utilizing a nozzle having an exit cross section and said exit cross section of the extruded rubber strip is formed by one or several sets of profile rollers to have a cross section different from said exit cross section and the rubber strips so formed are applied to said tread strip substrate and/or to the sides of the carcass with a roll-off applicator wheel.

* * * * *